United States Patent
Reeves et al.

(10) Patent No.: US 8,301,141 B1
(45) Date of Patent: Oct. 30, 2012

(54) AUTOMATIC PROFILE UPDATING FOR A WIRELESS COMMUNICATION DEVICE

(75) Inventors: Raymond Emilio Reeves, Olathe, KS (US); Michael Aaron Silvey, Olathe, KS (US); Ryan Alan Wick, Apollo Beach, FL (US); Wen Xue, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 125 days.

(21) Appl. No.: 12/868,954

(22) Filed: Aug. 26, 2010

(51) Int. Cl.
*H04W 4/00* (2009.01)
*H04M 1/66* (2006.01)
*H04M 3/00* (2006.01)

(52) U.S. Cl. .................... 455/435.1; 455/411; 455/418; 455/432.3

(58) Field of Classification Search .................... None
See application file for complete search history.

(56) References Cited

U.S. PATENT DOCUMENTS

| | | | |
|---|---|---|---|
| 5,903,845 A | 5/1999 | Buhrmann et al. | |
| 5,915,220 A | 6/1999 | Chelliah | |
| 6,298,228 B1 | 10/2001 | Singh | |
| 7,072,961 B1 | 7/2006 | Maclean et al. | |
| 7,243,105 B2 | 7/2007 | Thint et al. | |
| 7,634,258 B2 * | 12/2009 | Adatrao et al. | 455/418 |
| 2002/0002705 A1 | 1/2002 | Byrnes et al. | |
| 2003/0119528 A1 * | 6/2003 | Pew et al. | 455/456 |
| 2004/0192303 A1 * | 9/2004 | Puthenkulam | 455/435.1 |
| 2005/0108273 A1 | 5/2005 | Brebner | |
| 2006/0217111 A1 | 9/2006 | Marolia et al. | |
| 2007/0016775 A1 | 1/2007 | Islam et al. | |
| 2007/0206736 A1 | 9/2007 | Sprigg et al. | |
| 2007/0276795 A1 | 11/2007 | Poulsen | |
| 2008/0133677 A1 | 6/2008 | Pattabhiraman et al. | |
| 2010/0029248 A1 * | 2/2010 | Shi et al. | 455/411 |
| 2011/0159846 A1 * | 6/2011 | Kemshall | 455/411 |

* cited by examiner

*Primary Examiner* — Meless N. Zewdu
*Assistant Examiner* — William Nealon

(57) ABSTRACT

A profile audit system in a wireless network comprises a communication interface and a processing system. The communication interface is configured to receive a notification of a failed attempt by a first wireless communication device operated by a user to register with the wireless network using invalid registration data, and receive a user profile associated with the user. The processing system is configured to process the user profile and the invalid registration data to determine if a credential error has occurred, and if the credential error has occurred, process the user profile to determine if a second wireless communication device is associated with the user, and if the second wireless communication device is associated with the user, direct the communication interface to transfer an updated user profile for wireless delivery to the second wireless communication device, wherein the updated user profile includes valid registration data.

18 Claims, 5 Drawing Sheets

AUTOMATIC PROFILE UPDATING FOR A WIRELESS COMMUNICATION DEVICE

TECHNICAL BACKGROUND

To establish a communication session with a wireless access network, a user typically operates a wireless communication device to communicate in a wireless protocol with a wireless access node. The wireless access node then exchanges the user communications with other systems of the wireless access network, such as gateways, service nodes, and mobile switching centers, to ultimately provide a communication service, such as telephony voice communications or data access over the Internet.

However, in order to establish the communication session with the wireless network, the wireless communication device is typically required to first successfully register with the network. Device registration to establish a communication session often involves the wireless network receiving registration data from the wireless communication device attempting to register, such as device and user identifiers associated with the device or its user. In order to grant or deny the session request, a communication system in the wireless access network then retrieves user profile information from a profile storage system corresponding to the wireless communication device requesting registration. If the registration data provided by the wireless communication device is valid and matches the information in the user profile, the device is granted access to the wireless network and the communication session is established. However, if the wireless communication device provides invalid registration data, the information in the user profile will not match and the communication session request is denied.

OVERVIEW

A method of operating a profile audit system in a wireless network is disclosed. The method comprises receiving a notification of a failed attempt by a first wireless communication device operated by a user to register with the wireless network using invalid registration data, receiving a user profile associated with the user, and processing the user profile and the invalid registration data to determine if a credential error has occurred. The method further comprises, if the credential error has occurred, processing the user profile to determine if a second wireless communication device is associated with the user, and if the second wireless communication device is associated with the user, transferring an updated user profile for wireless delivery to the second wireless communication device, wherein the updated user profile includes valid registration data.

A profile audit system in a wireless network comprises a communication interface and a processing system. The communication interface is configured to receive a notification of a failed attempt by a first wireless communication device operated by a user to register with the wireless network using invalid registration data, and receive a user profile associated with the user. The processing system is configured to process the user profile and the invalid registration data to determine if a credential error has occurred, and if the credential error has occurred, process the user profile to determine if a second wireless communication device is associated with the user, and if the second wireless communication device is associated with the user, direct the communication interface to transfer an updated user profile for wireless delivery to the second wireless communication device, wherein the updated user profile includes valid registration data.

Another method of operating a profile audit system in a wireless network is disclosed. The method comprises receiving a notification of a failed attempt by a first wireless communication device operated by a user to register with the wireless network using invalid registration data, receiving a user profile associated with the user, and processing the user profile and the invalid registration data to determine if a credential error has occurred. The method further comprises, if the credential error has occurred, transferring an updated user profile for wireless delivery to the first wireless communication device and processing the user profile to determine if a second wireless communication device is associated with the user, and if the second wireless communication device is associated with the user, transferring the updated user profile for wireless delivery to the second wireless communication device, wherein the updated user profile includes valid registration data obtained from the user profile.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
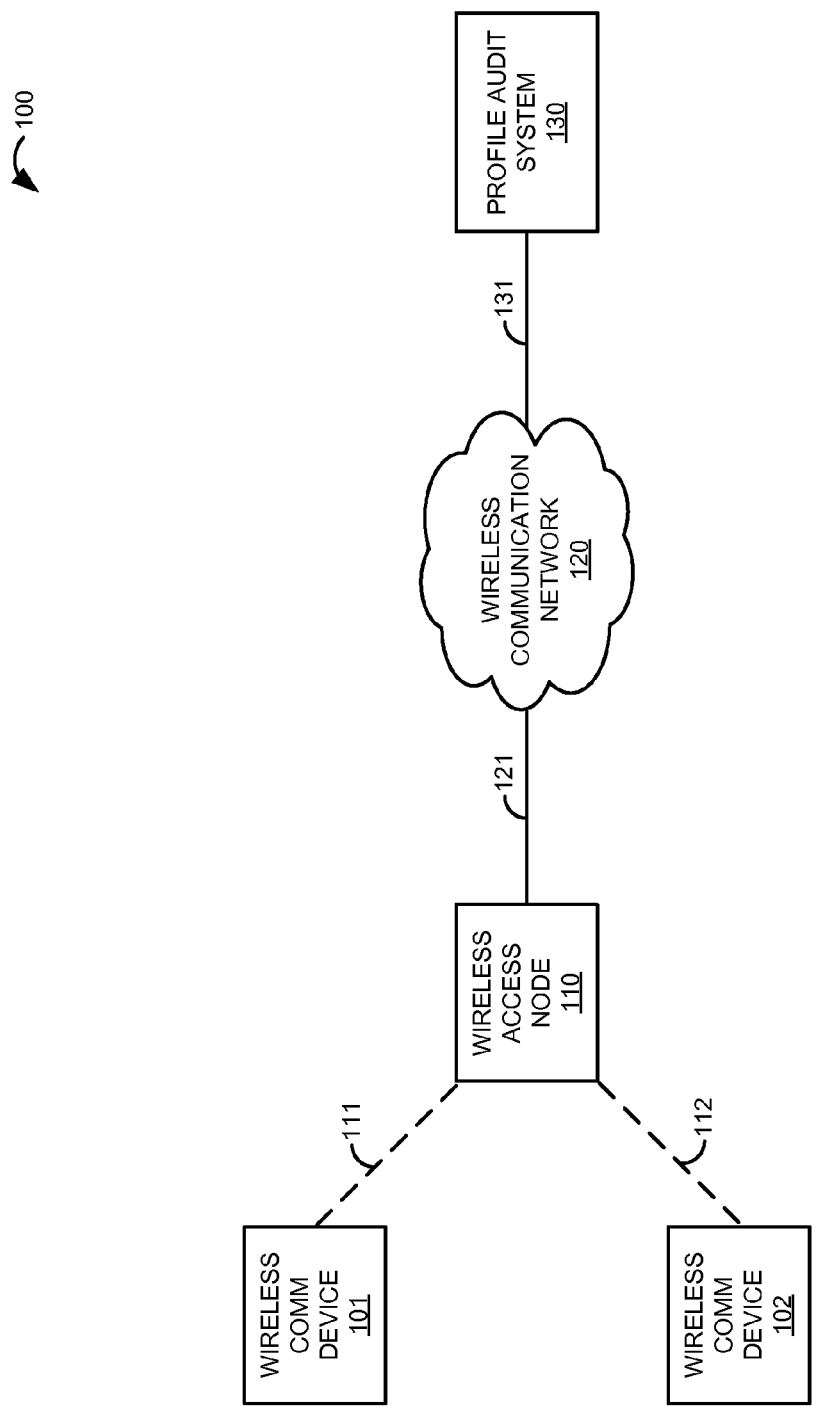
FIG. 1 is a block diagram that illustrates a communication system.

FIG. 1 is a block diagram that illustrates communication system 100. Communication system 100 includes wireless communication devices 101 and 102, wireless access node 110, wireless communication network 120, and profile audit system 130. Wireless communication devices 101 and 102 are in communication with wireless access node 110 over respective wireless communication links 111 and 112. Wireless access node 110 communicates with wireless communication network 120 over communication link 121. Wireless communication network 120 is in communication with profile audit system 130 over communication link 131.

Figure 2:
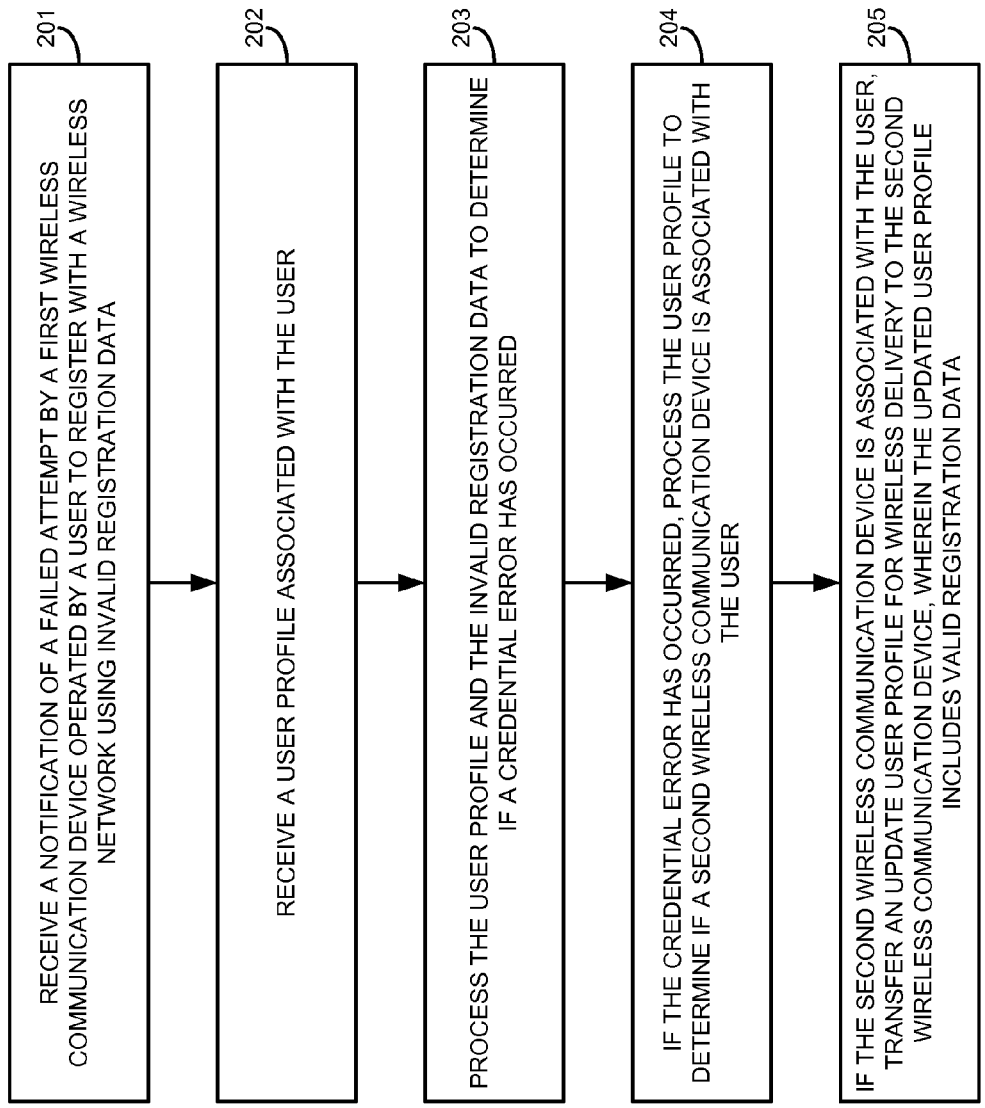
FIG. 2 is a flow diagram that illustrates an operation of the communication system.

FIG. 2 is a flow diagram that illustrates an operation of communication system 100. The steps of the operation are indicated below parenthetically. The exemplary operation shown in FIG. 2 depicts a method of operating profile audit system 130 in a wireless communication network 120.

To begin, profile audit system 130 receives a notification of a failed attempt by a first wireless communication device 101 operated by a user to register with a wireless network 120 using invalid registration data (201). Typically, profile audit system 130 receives the notification of the failed registration attempt transferred from a registration server, authorization system, data session registrar, service node, or some other communication system associated with wireless communication network 120. For example, an authorization system, such as an authentication, authorization, and accounting (AAA) server, may be configured to transfer the notification of the failed attempt for delivery to profile audit system 130 responsive to the failed attempt by the first wireless communication device 101 operated by the user to register with the wireless network 120 using the invalid registration data.

In some examples, the notification of the failed attempt includes the invalid registration data presented by the first wireless communication device 101 when attempting to register with the wireless network 120. Typically, the registration data is considered invalid when at least a portion of the registration data does not match the corresponding data stored in wireless network 120 needed to authenticate and authorize device 101 for network access. The invalid registration data could include various device and user identifiers associated with (or formerly associated with) wireless communication device 101 and its user. For example, the invalid registration data could comprise a Mobile Station International Subscriber Directory Number (MSISDN) or some other telephone number, Electronic Serial Number (ESN), Mobile Station Identifier (MSID), Mobile Equipment Identifier (MEID), International Mobile Equipment Identity (IMEI), International Mobile Subscriber Identity (IMSI), Media Access Control Identifier (MACID), User Identifier (UID), or some other identifier that uniquely identifies wireless communication device 101 and/or a user of device 101.

In addition to the notification of the failed attempt by the first wireless communication device 101 operated by the user to register with the wireless network 120, profile audit system 130 receives a user profile associated with the user (202). Typically, profile audit system 130 receives the user profile associated with the user responsive to receiving the notification of the failed registration attempt. For example, profile audit system 130 may receive the notification of the failed attempt to register by wireless communication device 101 and determine a user associated with device 101 based on the invalid registration data included with the notification message. Profile audit system 130 could then retrieve a user profile associated with the user of wireless communication device 101 from a database or other storage system. Typically, the user profile includes the most current version of registration data available to wireless network 120. For example, the user profile could include a user identifier associated with the user and a device identifier that identifies the first wireless communication device 101.

Profile audit system 130 then processes the user profile and the invalid registration data to determine if a credential error has occurred (203). Often, the credential error occurs when the invalid registration data includes outdated or corrupted information. In some examples, profile audit system 130 may process the user profile and the invalid registration data to determine that the invalid registration data is associated with an old user profile associated with the user. For example, wireless communication device 101 may have missed an attempt by wireless network 120 to update the user profile, so device 101 has an outdated user profile stored thereon. In other examples, profile audit system 130 may compare the information in the user profile to the invalid registration data to determine if the credential error has occurred. For example, profile audit system 130 could obtain valid registration data from the user profile, and process the user profile and the invalid registration data by comparing the valid registration data from the user profile to the invalid registration data to determine if the credential error has occurred.

If the credential error has occurred, profile audit system 130 processes the user profile to determine if a second wireless communication device 102 is associated with the user. Typically, profile audit system 130 might extract a device identifier for wireless communication device 102 or some other data from the user profile that indicates the user has a second wireless communication device 102. For example, profile audit system 130 may process the user profile to determine a device identifier that identifies the second wireless communication device 102. In addition, if the credential error has occurred, profile audit system 130 may transfer an updated user profile for wireless delivery to the first wireless communication device 101 in some examples.

If the second wireless communication device 102 is associated with the user, profile audit system 130 transfers an updated user profile for wireless delivery to the second wireless communication device 102, wherein the updated user profile includes valid registration data (205). In some examples, profile audit system 130 obtains the valid registration data from the user profile previously received by profile audit system 130 in operation 202. Typically, the valid registration data transferred for delivery to the second wireless communication device 102 enables device 102 to successfully register with wireless network 120. In some examples, the user profile received by profile audit system 130 in operation 202 is transferred to wireless communication device 102 as the updated user profile. However, the updated user profile could also comprise a patch that only updates the invalid registration data with the valid registration data obtained from the user profile in some examples.

Advantageously, profile audit system 130 can automatically update user profiles stored on a plurality of wireless communication devices 101 and 102 associated with a user responsive to a failed attempt to register with a wireless network 120 by one of the devices 101 or 102. For example, a user operating wireless communication device 101 or 102 might cancel, miss, or otherwise fail to receive a user profile update attempt by wireless network 120 needed for successful registration with the network 120. When the user then tries to register with wireless network 120 using a wireless communication device 101 or 102 having an outdated user profile, profile audit system 130 is notified of a failed registration attempt and determines if a credential error has occurred. In this manner, profile audit system 130 may automatically update wireless communication devices 101 or 102 with current and valid registration data in an updated user profile.

Referring back to FIG. 1, wireless communication devices 101 and 102 each comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication devices 101 and 102 may also include a user interface, memory device, software, processing circuitry, or some other communication components. For example, each wireless communication device 101 and 102 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication devices 101 and 102 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication devices 101 and 102 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNode B), and others. Wireless network protocols that may be utilized by wireless access node 110 include CDMA, GSM, UMTS, HSPA, EV-DO, EV-DO rev. A, 3GPP LTE, WiMAX, Wi-Fi, Bluetooth, Internet, telephony, or some other communication format—including combinations thereof.

Wireless communication network 120 represents the core network of a wireless communication provider, and could include routers, gateways, telecommunication switches, servers, processing systems, or other communication equipment and systems for providing communication and data services. Wireless communication network 120 could comprise wireless communication nodes, telephony switches, Internet routers, network gateways, computer systems, communication links, or some other type of communication equipment—including combinations thereof. Wireless communication network 120 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Wireless communication network 120 may be configured to communicate over metallic, wireless, or optical links. Wireless communication network 120 may be configured to use time-division multiplexing (TDM), Internet Protocol (IP), Ethernet, optical networking, wireless protocols, communication signaling, or some other communication format—including combinations thereof. In some examples, wireless communication network 120 includes further access nodes and associated equipment for providing communication services to many wireless communication devices across a large geographic region.

Profile audit system 130 comprises a processing system and communication interface. Profile audit system 130 may also include other components such as a router, server, data storage system, and power supply. Profile audit system 130 may reside in a single device or may be distributed across multiple devices. Profile audit system 130 may be a discrete system or may be integrated within other systems—including other systems within communication system 100. Profile audit system 130 could comprise a packet gateway, mobile switching center, network gateway system, Internet access node, application server, service node, firewall, or some other communication system—including combinations thereof.

Wireless communication links 111 and 112 use the air or space as the transport medium. Wireless communication links 111 and 112 may use various protocols, such as CDMA, GSM, UMTS, HSPA, EV-DO, EV-DO rev. A, 3GPP LTE, WiMAX, Wi-Fi, Bluetooth, Internet, telephony, or some other communication format—including combinations thereof. Wireless communication links 111 and 112 may comprise many different signals sharing the same link. For example, each wireless communication link 111 and 112 could include multiple signals operating in a single propagation path comprising multiple communication sessions, frequencies, timeslots, transportation ports, logical transportation links, network sockets, IP sockets, packets, or communication directions—including combinations thereof.

Communication links 121 and 131 use metal, air, space, optical fiber such as glass or plastic, or some other material as the transport media—including combinations thereof. Communication links 121 and 131 could use various communication protocols, such as TDM, IP, Ethernet, telephony, optical networking, hybrid fiber coax (HFC), communication signaling, wireless protocols, or some other communication format—including combinations thereof. Communication links 121 and 131 may be direct links or could include intermediate networks, systems, or devices.

Figure 3:
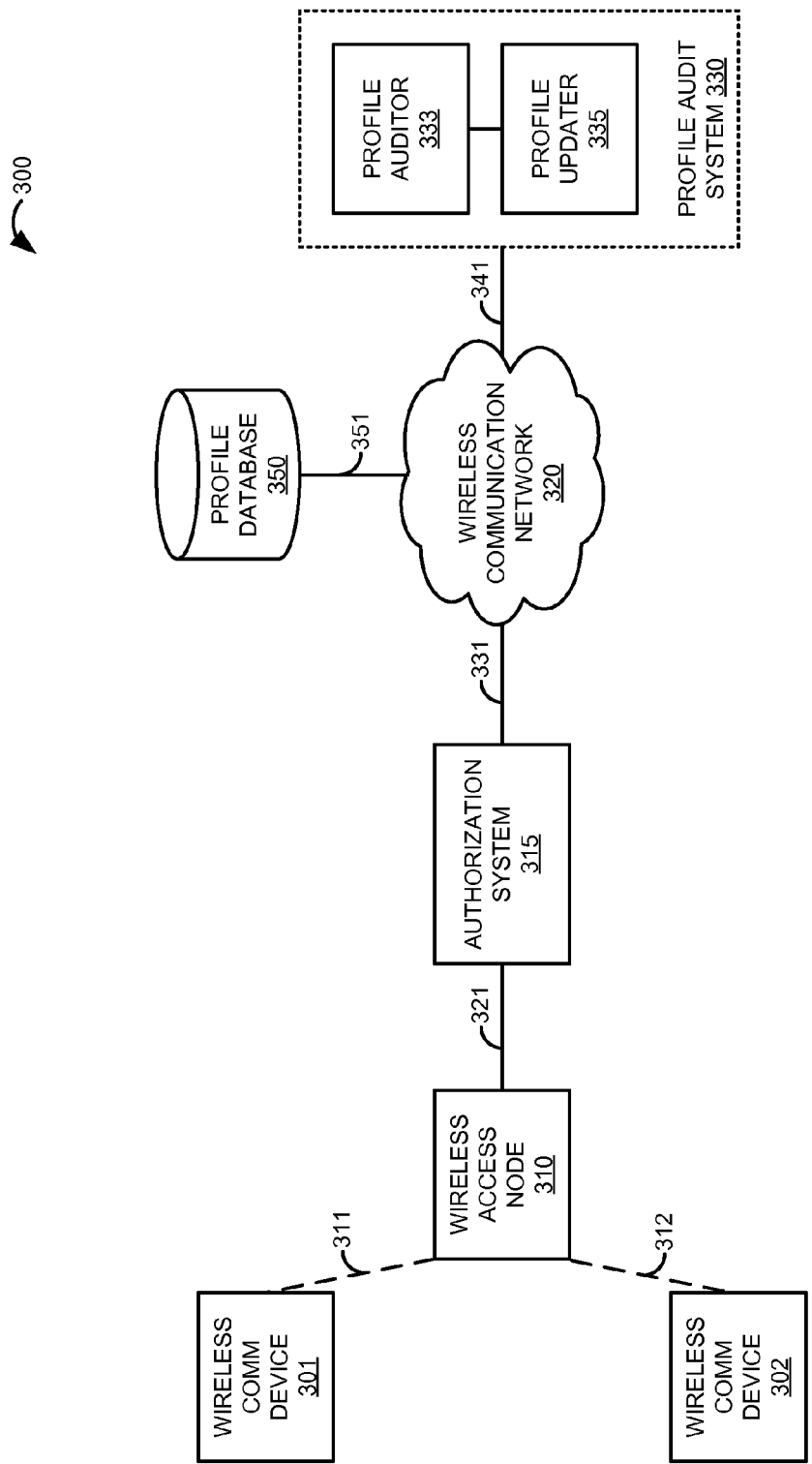
FIG. 3 is a block diagram that illustrates a communication system in an exemplary embodiment.

FIG. 3 is a block diagram that illustrates communication system 300. Communication system 300 includes wireless communication devices 301 and 302, wireless access node 310, authorization system 315, wireless communication network 320, profile audit system 330, and profile database 350. Wireless communication devices 301 and 302 communicate with wireless access node 310 over respective wireless links 311 and 312. Wireless access node 310 is in communication with authorization system 315 over communication link 321. Authorization system 315 communicates with wireless communication network 320 over communication link 331. Wireless communication network 320 is in communication with profile database 350 over communication link 351. Wireless communication network 320 is also in communication with profile audit system 330 over communication link 341. Profile audit system 330 includes profile auditor 333 and profile updater 335. Profile auditor 333 and profile updater 335 each typically comprise a processing system and communication interface. Profile auditor 333 and profile updater 335 may be geographically distributed across multiple devices in profile audit system 330, or may both reside in a single device comprising profile audit system 330. In the latter case, profile auditor 333 and profile updater 335 could comprise software modules configured to execute on profile audit system 330.

Figure 4:
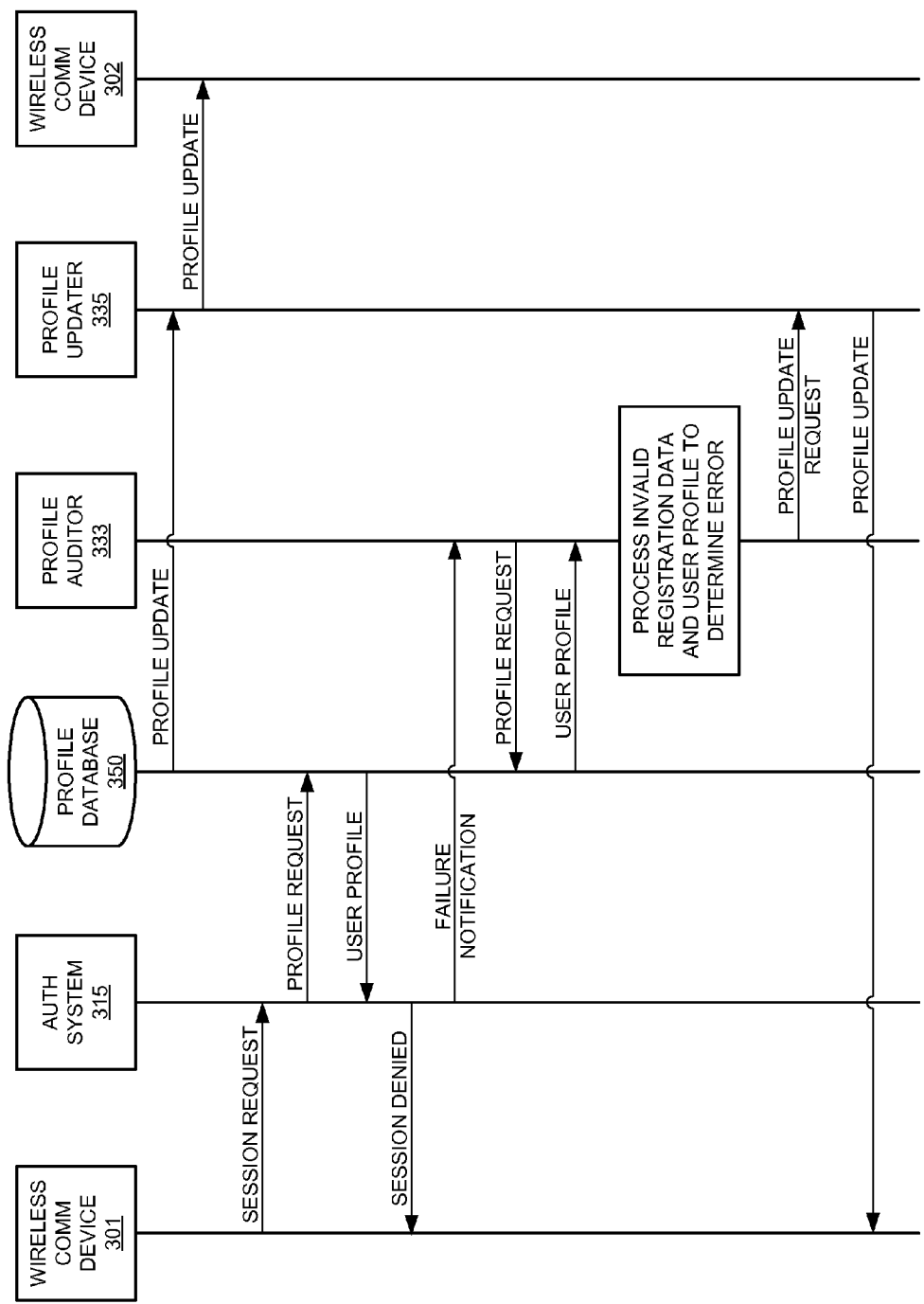
FIG. 4 is a sequence diagram that illustrates an operation of the communication system in an exemplary embodiment.

FIG. 4 is a sequence diagram that illustrates an operation of communication system 300 in an exemplary embodiment. In this example, a user is associated with both wireless communication devices 301 and 302. To begin, profile updater 335 receives a user profile update from profile database 350. The user profile update is associated with the user of wireless communication devices 301 and 302. Typically, profile database 350 receives updated user profile information from back-office systems whenever changes affecting a user profile occur, such as a new subscription, password reset, device change, or other account modifications. In this example, profile updater 335 receives the profile update from profile database 350 after database 350 receives the updated information for the user profile.

In response to receiving the user profile update, profile updater 335 attempts to transfer the profile update for delivery to wireless communication device 101 and 102 associated with the user. For example, profile updater 335 may process the user profile update to determine that wireless communication devices 101 and 102 are associated with the user and should receive the profile update. In this example, however, only wireless communication device 302 receives the user profile update from profile updater 335. Wireless communication device 301 does not receive the user profile update because device 301 is powered off when profile updater 335 attempts to transfer the update.

At a later point in time, the user powers on wireless communication device 301 and a communication session request is transferred for delivery to authorization system 315. The session registration request typically includes access credentials, security tokens, device and/or subscriber identifiers, or other information associated with wireless communication device 301 and its user. Upon receiving the session request from wireless communication device 301, authorization system 315 typically processes the registration data and other information included in the session registration request to determine a user associated with device 301. Authorization system 315 then transfers a user profile request query to profile database 350 requesting the user profile for the user identified in the registration data.

Responsive to receiving the user profile from profile database 350, authorization system 315 processes the user profile and the registration data received in the session request to authenticate the user of wireless communication device 301. However, in this example, since wireless communication device 301 did not receive the recent user profile update from profile updater 335, at least some of the registration data included in the session request is invalid and does not match the corresponding data in the user profile. Therefore, authorization system 315 determines that wireless communication device 301 is unauthorized for a session with wireless network 320 and denies the session request.

Prior to, during, and/or after informing wireless communication device 301 of the session registration failure, authorization system 315 transfers a notification to profile auditor 333 of the failed attempt by device 301 to register with wireless communication network 320. Typically, authorization system 315 transfers the notification of the failed registration attempt to profile auditor 333 responsive to wireless communication device 301 providing invalid registration data and failing to register. However, in some examples, authorization system 315 may be configured to transfer the notification of the failed registration attempt based on a flag in the user profile, a user preference, a group or classification associated with device 301 or the user, or some other settings configuration.

The registration failure notification includes information related to the failed registration attempt, including the invalid registration data submitted by wireless communication device 301. Profile auditor 333 typically processes this information upon receipt of the failure notification from authorization system 315 to determine the user associated with device 301 that failed registration. Profile auditor 333 then requests the latest profile data from profile database 350 for this user. In some example, profile auditor 333 may also request user profile data from back-office systems.

After receiving the current user profile data from profile database 350, profile auditor 333 processes the current user profile and the invalid registration data to determine an error that caused the registration failure. In this example, profile auditor 333 is configured to compare the detailed information in the user profile to the information that wireless device 301 provided to authorization system 315 when attempting to register. Profile auditor 333 typically processes the invalid registration data and the user profile to identify inconsistencies and other erroneous information in the registration data provided by device 301.

Once profile auditor 333 processes the user profile and the invalid registration data to determine the erroneous data that caused the registration failure, profile auditor 333 transfers a profile update request for wireless device 301 to profile updater 335. Typically, the profile update request instructs profile updater 335 to proceed with an over-the-air (OTA) profile update to wireless communication device 301. In some examples, the profile update request could also direct profile updater 335 to wirelessly transfer a profile update to all wireless communication devices 301 and 302 indicated in the user profile.

Responsive to the profile update request, profile updater 335 transfers a user profile update for wireless delivery to wireless communication device 301. The user profile update typically includes current and valid registration data to correct the erroneous information provided by device 301 during the failed registration attempt. In some examples, responsive to the profile update request from profile auditor 333, profile updater 335 could determine which wireless communication devices 301 and 302 have not received the latest profile update, and then transfer the profile update only to those devices still having an old profile, which in this example is only wireless communication device 301. Advantageously, once wireless communication device 301 receives the profile update, the user can successfully register with wireless network 320 using device 301. Further, since wireless device 301 automatically receives the profile update from profile updater 335, the user avoids having to manually contact personnel at wireless communication network 320 in order to correct the registration error and receive the updated profile data.

Figure 5:
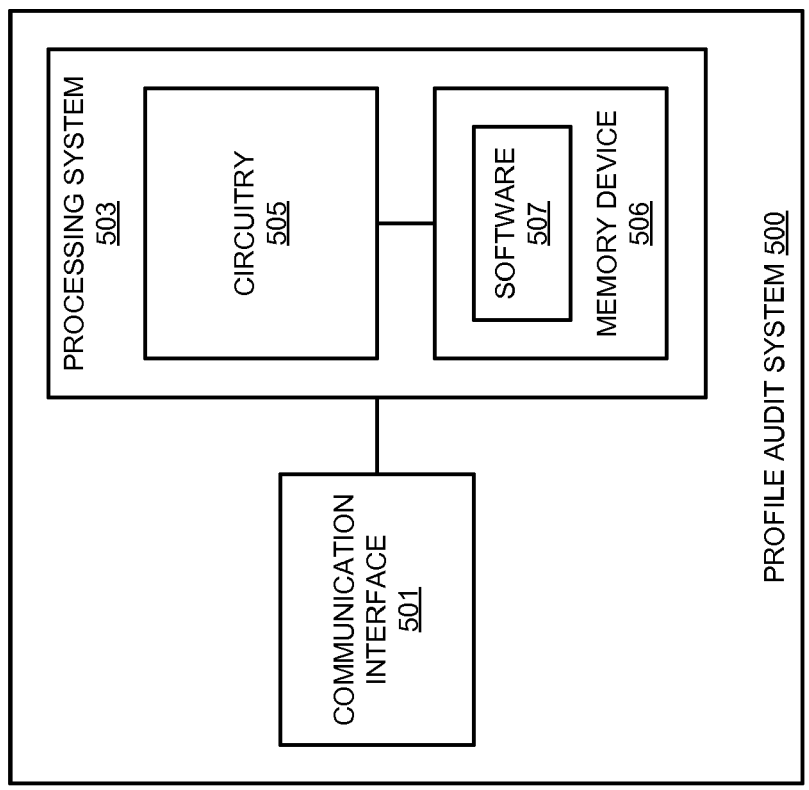
FIG. 5 is a block diagram that illustrates a roaming management computer system.

FIG. 5 is a block diagram that illustrates profile audit system 500. Profile audit system 500 provides an example of profile audit systems 130 and 330, although systems 130 and 330 may use alternative configurations. Profile audit system 500 comprises communication interface 501 and processing system 503. Processing system 503 is linked to communication interface 501. Processing system 503 includes processing circuitry 505 and memory device 506 that stores operating software 507.

Communication interface 501 comprises components that communicate over communication links, such as network cards, ports, RF transceivers, processing circuitry and software, or some other communication components. Communication interface 501 may be configured to communicate over metallic, wireless, or optical links. Communication interface 501 may be configured to use TDM, IP, Ethernet, optical networking, wireless protocols, communication signaling, or some other communication format—including combinations thereof. Communication interface 501 could be configured to receive a notification of a failed attempt by a first wireless communication device operated by a user to register with a wireless network using invalid registration data, and to receive a user profile associated with the user. Further, communication interface 501 could be configured to transfer an updated user profile for wireless delivery to a second wireless communication device, wherein the updated user profile includes valid registration data.

Processing circuitry 505 comprises microprocessor and other circuitry that retrieves and executes operating software 507 from memory device 506. Memory device 506 comprises a disk drive, flash drive, data storage circuitry, or some other memory apparatus. Operating software 507 comprises computer programs, firmware, or some other form of machine-readable processing instructions. Operating software 507 may include an operating system, utilities, drivers, network interfaces, applications, or some other type of software.

When executed by circuitry 505, operating software 507 directs processing system 503 to operate as described herein for profile audit systems 130 and 330. In particular, operating software 507 may direct processing system 503 to direct communication interface 501 to receive a notification of a failed attempt by a first wireless communication device operated by a user to register with the wireless network using invalid registration data, and to receive a user profile associated with the user. In addition, operating software 507 directs processing system 503 to process the user profile and the invalid registration data to determine if a credential error has occurred, and if the credential error has occurred, to process the user profile to determine if a second wireless communication device is associated with the user. Further, if the second wireless communication device is associated with the user, operating software 507 directs processing system 503 to direct communication interface 501 to transfer an updated user profile for wireless delivery to the second wireless communication device, wherein the updated user profile includes valid registration data. In some examples, operating software 507 could comprise a profile auditor software module that processes the user profile and the invalid registration data to determine if a credential error has occurred, and if the credential error has occurred, processes the user profile to determine if a second wireless communication device is associated with the user. Additionally, operating software 507 could comprise a profile updater software module that transfers an updated user profile for wireless delivery to the second wireless communication device if the second wireless communication device is associated with the user, wherein the updated user profile includes valid registration data.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a profile audit system in a wireless network, the method comprising:
   receiving a notification of a failed attempt by a first wireless communication device operated by a user to register with the wireless network using invalid registration data;
   receiving a user profile associated with the user;
   processing the user profile and the invalid registration data to determine that a credential error has occurred by determining that the invalid registration data is associated with an old user profile associated with the user; and
   based on the credential error having occurred, processing the user profile to determine that a second wireless communication device is associated with the user
   and responsively transferring valid registration data for wireless delivery to the second wireless communication device.

2. The method of claim 1 further comprising, based on the credential error having occurred, transferring the valid registration data for wireless delivery to the first wireless communication device.

3. The method of claim 1 wherein processing the user profile to determine that the second wireless communication device is associated with the user comprises processing the user profile to determine a device identifier that identifies the second wireless communication device.

4. The method of claim 1 wherein the valid registration data is obtained from the user profile.

5. The method of claim 4 wherein processing the user profile and the invalid registration data to determine that the credential error has occurred comprises comparing the valid registration data from the user profile to the invalid registration data to determine if the credential error has occurred.

6. The method of claim 1 wherein receiving the notification of the failed attempt comprises receiving the notification of the failed attempt transferred from an authorization system.

7. The method of claim 6 wherein the authorization system is configured to transfer the notification of the failed attempt for delivery to the profile audit system responsive to the failed attempt by the first wireless communication device operated by the user to register with the wireless network using the invalid registration data.

8. The method of claim 1 wherein the user profile includes a user identifier associated with the user and a device identifier that identifies the first wireless communication device.

9. The method of claim 1 wherein the user profile includes the valid registration data.

10. A profile audit system in a wireless network, the system comprising:
    a communication interface configured to receive a notification of a failed attempt by a first wireless communication device operated by a user to register with the wireless network using invalid registration data, and receive a user profile associated with the user;
    a processing system configured to process the user profile and the invalid registration data to determine that a credential error has occurred by determining that the invalid registration data is associated with an old user profile associated with the user; and
    the processing system configured to, based on the credential error having occurred, process the user profile to determine that a second wireless communication device is associated with the user
    and responsively direct the communication interface to transfer valid registration data for wireless delivery to the second wireless communication device.

11. The system of claim 10 further comprising the processing system configured to, based on the credential error having occurred, direct the communication interface to transfer the valid registration data for wireless delivery to the first wireless communication device.

12. The system of claim 10 wherein the processing system configured to process the user profile to determine that the second wireless communication device is associated with the user comprises the processing system configured to process the user profile to determine a device identifier that identifies the second wireless communication device.

13. The system of claim 10 wherein the valid registration data is obtained from the user profile.

14. The system of claim 13 wherein the processing system configured to process the user profile and the invalid registration data to determine that the credential error has occurred comprises the processing system configured to compare the valid registration data from the user profile to the invalid registration data to determine if the credential error has occurred.

15. The system of claim 10 wherein the communication interface configured to receive the notification of the failed attempt comprises the communication interface configured to receive the notification of the failed attempt transferred from an authorization system.

16. The system of claim 15 wherein the authorization system is configured to transfer the notification of the failed attempt for delivery to the profile audit system responsive to the failed attempt by the first wireless communication device operated by the user to register with the wireless network using the invalid registration data.

17. The system of claim 10 wherein the user profile includes a user identifier associated with the user and a device identifier that identifies the first wireless communication device.

18. A computer apparatus to facilitate updating registration data for devices in a wireless network, the apparatus comprising:

software instructions configured, when executed by a profile audit system, to direct the profile audit system to receive a notification of a failed attempt by a first wireless communication device operated by a user to register with the wireless network using invalid registration data, receive a user profile associated with the user, process the user profile and the invalid registration data to determine that a credential error has occurred by determining that the invalid registration data is associated with an old user profile associated with the user, and based on the credential error having occurred, process the user profile to determine that a second wireless communication device is associated with the user and responsively transfer valid registration data for wireless delivery to the second wireless communication device; and at least one non-transitory computer-readable storage medium storing the software instructions.

\* \* \* \* \*